United States Patent [19]

Jennings

[11] 4,174,986
[45] Nov. 20, 1979

[54] METHOD OF FORMING A FLEXIBLE TAPERED END FOR AN EXTRUDED PLASTIC MOLDING STRIP

[75] Inventor: Robert E. Jennings, Bayville, N.J.

[73] Assignee: General Motors Corporation, Detroit, Mich.

[21] Appl. No.: 885,753

[22] Filed: Mar. 13, 1978

[51] Int. Cl.² .............................................. B32B 31/18
[52] U.S. Cl. ................... 156/160; 156/211; 156/217; 156/258; 428/31
[58] Field of Search ............... 156/211, 257, 258, 268, 156/160, 163, 217, 229; 428/81, 31

[56] References Cited

U.S. PATENT DOCUMENTS

| | | | |
|---|---|---|---|
| 2,487,951 | 11/1949 | Stein | 156/211 |
| 3,635,787 | 1/1972 | Shanok | 156/211 |
| 3,970,498 | 7/1976 | Loew | 156/211 |

*Primary Examiner*—William A. Powell
*Assistant Examiner*—William H. Thrower
*Attorney, Agent, or Firm*—George A. Grove

[57] ABSTRACT

The invention pertains to a novel method of forming a flexible, tapered end on a thermoplastic molding strip. The strip is of the type having a top surface shaped to provide desired protective and/or decorative functions. The bottom surface is generally flat for bonding to a desired article such as a side panel or door of an automotive vehicle. In a preferred embodiment, the method comprises removing a V-shaped notch from the end of the strip, with the opening of the V at the end, to form adjacent triangular shaped legs. The notched end is then bent to stretch the bottom surface and the legs are drawn together to form the taper. The edges of the legs adjacent the taper are bonded together only at the pointed end. Multiple cuts are then made into the bottom surface of the strip, perpendicular to the line formed by closing the notch, between the tip and the original apex of the notch. The finished tapered end is flexible and virtually free of residual stress which may cause a strip to delaminate when applied to a desired substratum.

3 Claims, 8 Drawing Figures

U.S. Patent     Nov. 20, 1979     4,174,986
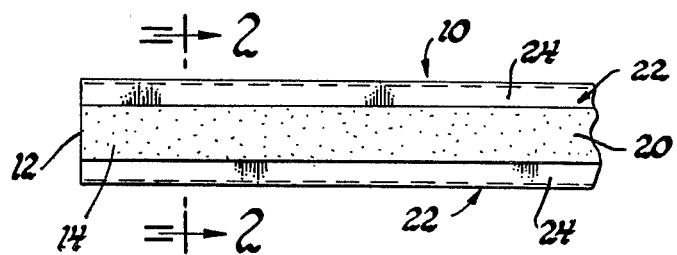
Fig.1
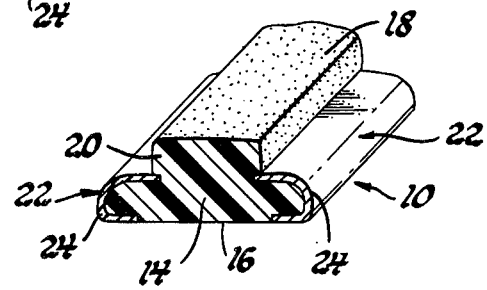
Fig.2
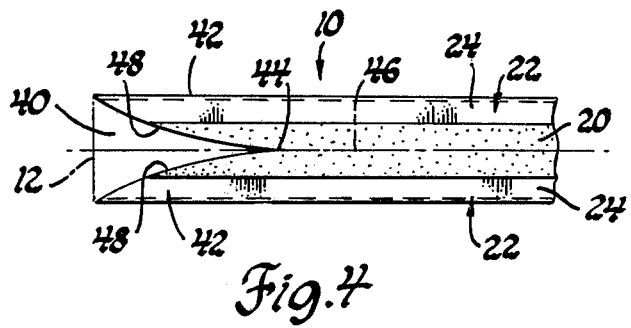
Fig.4
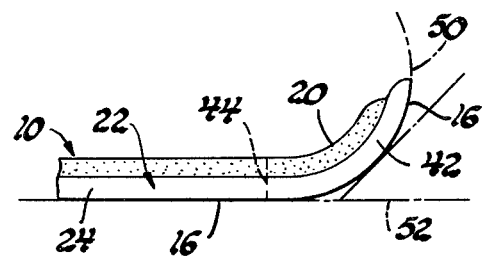
Fig.5
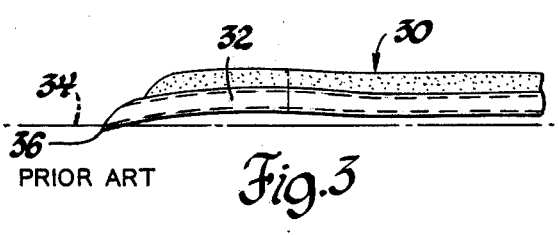
PRIOR ART   Fig.3
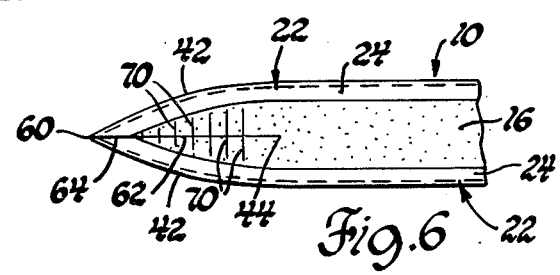
Fig.6
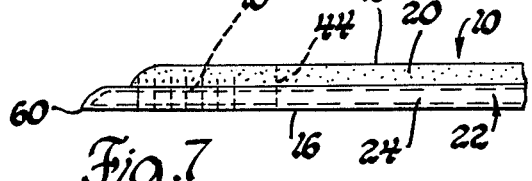
Fig.7
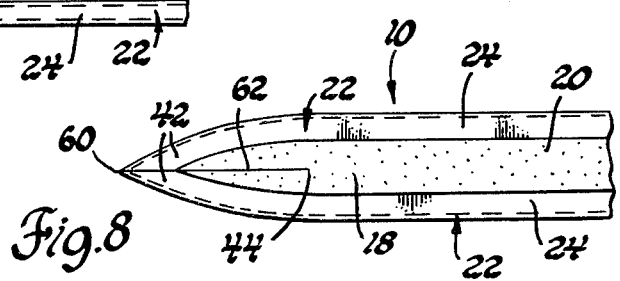
Fig.8

METHOD OF FORMING A FLEXIBLE TAPERED END FOR AN EXTRUDED PLASTIC MOLDING STRIP

BACKGROUND OF THE INVENTION

This invention relates to a method of forming a tapered or pointed end on an extruded thermoplastic resin molding strip. More particularly, this invention relates to a novel method of forming a flexible tapered end on a plastic molding strip of the type which may be mounted on a side panel or door of an automotive vehicle for protection and decoration.

Before this invention a tapered end was formed on an extruded thermoplastic strip by removing a V-shaped notch from the end of the strip as viewed from the top. Opposing triangular shaped legs were thereby formed on either side of the notch, extending from the apex of the notch to the end of the strip. The depth of the notch corresponded to a desired degree of taper on the end. The surfaces of the legs adjacent to the notch were heated from the apex along their entire length to melt the plastic. The legs were then pressed together to fuse the plastic and held in place until it solidified.

A recurrent problem with strips formed in the above manner has been their tendency to arch at the tapered end. This arching is probably due to the residual stress created in the plastic by the tapering operation. When such a strip is applied to a substratum with an adhesive, this residual stress may cause the end to pull loose, and once exposed, the entire strip may delaminate.

It is therefore an object of this invention to provide a method of forming a tapered end on an extruded thermoplastic resin molding strip so that it tends not to pull away from a substratum when applied with a suitable adhesive. It is a further object of my method to provide a tapered end with flexibility and wherein the stress brought about by conventional tapering methods is essentially relieved.

In accordance with a preferred practice of my invention, these and other objects may be accomplished as follows. A molding strip is formed having a top surface shaped to provide desired decorative and/or protective functions. The top surface typically comprises a plastic crown portion along the longitudinal center, parallel to the bottom, and decorative foil covered edges set back from the crown. The crown is adapted to a absorb minor impacts to protect the substratum and the decorative foil edges of the strip. The bottom of the strip preferably defines a generally flat plane to accommodate bonding to a substratum such as an automotive vehicle door or fender with a suitable adhesive. The strips are usually made by extruding long lengths of a suitable thermoplastic resin such as poly(vinyl chloride) (PVC) through a die, and cutting the strip into segments of desired lengths. In many instances the appearance of a trim strip is greatly enhanced when a pointed taper is formed at its ends. The subject invention involves an improved method of forming these tapered ends so that they do not tend to thereafter delaminate from the substrate to which they are attached.

Like the prior art, my method entails first removing a V-shaped wedge from an end of a strip shaped like that described above. The apex of the V is located at a point remote from the end of the strip on the central longitudinal axis of the strip. The distance between this point and the end of the strip determines the degree of taper. Removal of the V-shaped wedge creates two like triangular legs which are later drawn together to create the pointed taper. The remaining steps of my method depart from the prior method and provide a pointed tapered end with unexpected flexibility and resistance to deformation due to residual stress.

In a preferred embodiment, the legs at the notched end are bent upwardly about 45° by any suitable means. This bending step stretches the plastic at the backside or bottom of the strip along the length of the notch and is believed to counteract the tendency of the end to arch after the taper is formed.

While the notched end of the strip is maintained in the bent state, the edges of the legs adjacent the V-notch are heated at the ends remote from the apex to melt the surface of the plastic. The edges are then pressed together and the plastic is allowed to solidify, fusing the legs together at the point of the taper. Joining the edges only near the point is believed to create less residual stress in the taper than the prior art method of bonding along the entire length of the notch.

After the edges are joined, the end is released from the bending means and it returns substantially to the unbent state. The operation is then completed by forming a series of cuts into the back of the strip perpendicular to the longitudinal axis. The cuts are made at about ⅛ inch intervals from between the apex point of the closed notch and the pointed end of the taper. The cuts penetrate through the bottom of the strip to just below the top surface. They provide the end with flexibility and probably provide a release for any latent residual stress brought about by joining the edges near the pointed end.

The practice of my invention not only provides a cosmetically pleasing result but also eliminates the abovementioned problems created by prior art methods. My invention will be better understood in view of a detailed description of a preferred embodiment which follows. Reference will be made to the drawing in which:

FIG. 1 depicts a top plan view of an extruded thermoplastic molding strip having a contoured top surface and a squared-off end;

FIG. 2 is a perspective view of the molding strip of FIG. 1 including a section taken across line 2—2;

FIG. 3 is a side view of a strip with a tapered end formed in accordance with a prior art practice showing the adverse effect of residual stress;

FIG. 4 is a top plan view of a molding strip from which a V-shaped notch has been removed;

FIG. 5 shows a side view of an end of a molding strip in the upward bent position preparatory to joining the tip ends of the legs;

FIG.6 shows the planar bottom surface of a molding strip with spaced lateral cuts formed according to the invention;

FIG. 7 is a side view of the finished molding strip; and

FIG. 8 shows a top plan view of a finished molding strip having a tapered, pointed end formed in accordance with the invention.

Referring to FIGS. 1 and 2, a preferred molding strip 10 is shown with a square cut end 12. The strip 10 comprises an elongated extruded thermoplastic resin body 14. A preferred body material is poly(vinyl chloride) (PVC) containing desired plasticizers, coloring agents, fillers and other processing chemicals. While PVC is a preferred material, any other thermoplastic composition suitable for making such molding strips would be equally useful for the practice of the invention.

The bottom 16 of strip 10 defines a generally flat, planar surface. The top comprises a protruding cap portion 20 parallel to the bottom 16. The cap 20 is boardered on either side with edge or shoulder portions 22, shown to be covered with a decorative tape 24. In this preferred embodiment, the body 14 was coextruded with a trilayer tape consisting of aluminum foil laminated on either side with Mylar ® film.

As described above, in the prior art procedure a taper on such a strip was formed by cutting a V-shaped notch in the end to form triangular legs. The legs were simply drawn together and fused along their entire length. FIG. 3 shows the adverse effect of this method. The stress introduced into the tapered end 32 causes the strip 30 to arch away from the substratum 34 and assume the shape of a "cobra head". Typically, some time after the cobra head forms, the pointed tip 36 pulls away and the entire strip 30 may then delaminate.

In accordance with a preferred practice of my invention, a flexible tapered end was formed on a strip of the type described above. The strip was approximately 0.7 inch wide, 0.3 inch high, and one end was originally squared off. Referring to FIG. 4, a V-shaped wedge 40 was removed from the squared-off end 12 (dotted line) forming like, generally triangular, legs 42. The apex 44 of the V 40 was located about 1.1 inches from the end 12 of the strip 10 on the longitudinal central axis 46. The cuts for the wedge 40 were made perpendicular to the bottom 16 of the strip 10 to provide symmetrical bonding edges 48 on the triangular legs 42.

The notched end of the strip 10 was then clamped in an apparatus (not shown) provided to suitably bend the triangular legs 42 and secure them together for bonding. Referring to FIG. 5, the legs 42 were bent to be shaped substantially like a portion of a right circular cylinder 50 (shown in broken lines) and form about a 45° angle with respect to the plane 52 of the bottom 16 of the unbent portion of strip 10. This bending serves to stretch the plastic on the bottom 16 of strip 10 and is believed to prevent the end from arching after the taper is formed.

While the end was maintained in the bent state, the edges 48 of legs 42 adjacent notch 10 (FIG. 4) were heated to about 0.5 inch back from the end 12 until the surface plastic melted. The legs 42 were then pressed together by the clamping means so that they fused together to form a pointed end 60 as the plastic cooled and solidified (see FIG. 6 and 8). Although the legs were fused together in this particular embodiment, they may be otherwise fastened or bonded together at the pointed end by any suitable means such as, e.g., mechanical fasteners or solvent bonding. When the legs 42 are drawn together, they closely contact each other in a line 62 which runs from the tip 60 to what was the apex 44. However, the legs 42 are preferably bonded only along the portion of the line adjacent the end 64 shown by a darkened line at FIG. 6. The end was removed from the apparatus and laid flat in preparation for further processing.

Referring to FIGS. 6 and 7, a series of spaced lateral cuts 70 were formed between the outside lateral edges of strip 10 perpendicular to line 62 formed by joining edges 48. In this case, a series of seven cuts, about ⅛ inch apart were made in the backside of the strip beginning about ¼ inch from the point of the tapered end. The spacing of the cuts is not critical so long as enough cuts are made to provide the tapered end with flexibility, and possibly release residual stress of the taper. The cuts 70 penetrate generally at right angles with respect to the bottom 16 of the strip 10. They were formed with knives shaped so that the cuts 70 extend to just below the contoured top surface 18 of the strip 10 as best illustrated in broken lines at FIG. 7. It is believed that this cutting step, along with bonding the tapered end only near the tip 60 while the strip is in a bent position, relieves or prevents any residual stress that may be created by the tapering operation.

When the finished strip, shown at FIG. 8, is viewed from the top, the line 62 formed from the apex 44 of the closed notch to the pointed tip 60 is barely visible. My process provides the end of a thermoplastic molding strip with sufficient flexibility to be joined to either a flat or contoured surface by means of known adhesives without pulling away at the tapered end due to residual stress created by the tapering operation.

In the preferred embodiment described, a V-shaped portion was removed such that generally triangular (i.e., pointed) legs remained at the end of the strip. They were drawn together and bonded so that the tapered end of the strip terminated in a point. It will be appreciated that V-shaped portions could be removed such that other tapered end configurations would be formed.

While my invention has been described in terms of specific embodiments thereof, it will be appreciated that other forms may be adapted by those skilled in the art. Therefore, my invention is limited only by the following claims.

The embodiments of the invention in which an exclusive property or privilege is claimed are defined as follows:

1. A method of forming a taper on an end portion of a molded plastic strip comprising the steps of
   removing a V-shaped piece from said end portion of said strip to form generally triangular shaped legs, as viewed at the top, said legs being adjacent to the apex of the V,
   bending said legs in an upward direction as said strip is viewed from the top such that their bottom surfaces are stretched and, while said legs are bent, drawing them together in line contact as viewed at said top and bottom surfaces to form said taper, said line extending from said apex to the tip of the newly formed taper, and bonding said legs together along a portion of said line at the tip of the taper remote from the apex, and thereafter
   forming a series of spaced cuts in the tapered end of said strip through its bottom surface in a direction substantially perpendicular to the said contact line.

2. In a method of providing an end of a molded plastic strip with a desired taper, said taper being formed by removing a V-shaped portion from said end and thereafter joining the edges of the strip adjacent said V, the improvement comprising,
   bending said end in an upward direction as said strip is viewed from the top such that the plastic on the bottom of the strip is stretched and while the strip is maintained in the bent state bonding the edges adjacent the V together at the ends remote from the apex of the V to form the taper, said edges forming a line between said apex and the tip of the taper; and thereafter
   forming a series of spaced cuts into the bottom of the strip along the taper, said cuts being made in a direction substantially perpendicular to said line.

3. A method of forming a flexible taper on an end portion of a molded plastic strip having a bottom which is substantially flat and a top comprising a protruding cap portion with shoulder portions on either side of said cap portion, said strip being of the type useful to decorate and/or protect a desired substrate, the method comprising the steps of removing a V-shaped piece from said end portion of said strip such that the edges formed adjacent said V can be moved together to form said taper, bending said end portion of said strip in an upward direction as said strip is viewed from the top such that the bottom surface is stretched and while the strip is maintained in the bent state bonding the edges of the strip adjacent the V at the ends remote from the apex to form the taper; and thereafter forming a series of spaced cuts into the tapered end of the strip in a direction substantially perpendicular to the line formed by bonding said edges, said cuts being made through the bottom of the strip to below the top surface such that said cuts do not show on the top surface of the strip.

* * * * *